(No Model.)
D. A. B. BAILEY & N. McGILLIVARY.
APPARATUS FOR DETECTING LEAKS IN SOIL AND OTHER PIPES.
No. 386,446. Patented July 24, 1888.
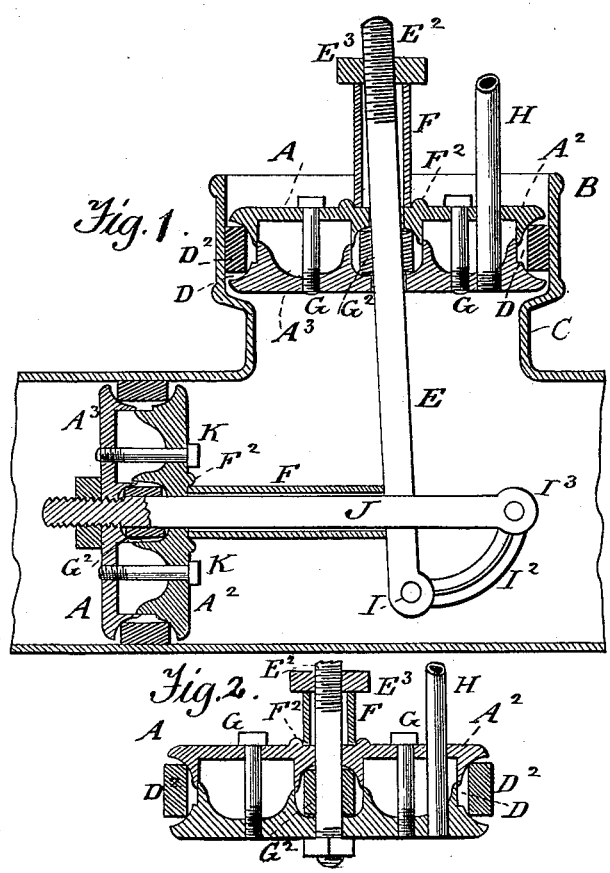
Witnesses.
A. Ruppert.
Elida C. Hough.
Inventors.
Daniel A. B. Bailey, And
Norman McGillivary,
by Franklin H. Hough,
Atty.

UNITED STATES PATENT OFFICE.

DANIEL A. B. BAILEY AND NORMAN McGILLIVARY, OF POTSDAM, NEW YORK.

APPARATUS FOR DETECTING LEAKS IN SOIL AND OTHER PIPES.

SPECIFICATION forming part of Letters Patent No. 386,446, dated July 24, 1888.

Application filed December 5, 1887. Serial No. 256,980. (No model.)

*To all whom it may concern:*

Be it known that we, DANIEL A. B. BAILEY and NORMAN McGILLIVARY, citizens of the United States, residing at Potsdam, in the county of St. Lawrence and State of New York, have invented certain new and useful Improvements in Apparatus for Detecting Leaks in Soil and other Pipes; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to that class of devices which are used in plugging or stopping pipes or mains for the purpose of detecting leaks; and it has for its object to provide a means for effectually closing soil or other pipes at any desired point, and of afterward filling the pipe in the rear of the point of stoppage, so as to cause the water within the pipe to escape through any leaks or imperfections which may exist, thus rendering it possible to at once detect and locate leaks.

To these ends and to such others as the invention may relate, the same consists in the peculiar combinations and in the novel construction, arrangement, and adaptation of parts, all as more fully hereinafter described, shown in the accompanying drawings, and then specifically defined in the claims.

In the accompanying drawings, Figure 1 is a view in which I have shown the form of valve-coupling used when the pipes are arranged at right angles. Fig. 2 is a section through one of the valve-plugs.

Reference being had to the details of the drawings, A represents a valve seated within an enlarged opening, B, forming the entrance to the soil-pipe C. This valve is constructed in two separate sections, $A^2$ $A^3$, each section being cut away or recessed around its periphery, thus forming the space D, for the reception of the rubber packing-ring $D^2$.

E is a rod passed centrally through the valve and provided at its upper end with a screw-threaded portion, $E^2$, for the reception of the nut $E^3$, which, when in place upon the rod E, bears directly upon the upper end of the collar or sleeve F, the lower end of which rests upon the shoulder $F^2$ upon the upper face of the valve-section $A^2$.

G G are bolts connecting the upper and lower sections of the valve, as shown.

H is a filling-tube, the use of which will hereinafter be more fully explained. Sleeved on the rod E, between the two parts of the valve, is an elastic packing-ring, $G^2$, which, as the two parts of the valve are compressed, fills the space around the rod and prevents leakage at this point.

J is a valve-rod arranged at substantially right angles to the rod E, and provided at one end with a valve, A, in all respects similar to the valve above described, in connection with the rod E. The other end of this rod J is formed with an eye or ear, $I^3$, and the adjacent end of the rod E is formed with similar ears, I, and $I^2$ is a curved lever pivotally connected to the ears of these two rods, as shown. It is obvious, however, that the form of connection between the valves is necessarily subject to variation, the same depending upon the arrangement of the pipes at the point at which it is proposed to use the apparatus.

While we have shown the two rods or valve-stems E J arranged at right angles to each other, we do not intend to restrict ourselves to such precise arrangement, as it is evident that the same may be changed to suit the positions of the pipes in which the device is to be used without departing from the spirit of our invention.

In operation the valve carried upon the end of the rod J is placed in position upon the pipe C, through the opening B, the rubber packing-ring upon the periphery of the valve having been expanded by tightening the bolts K, so as to cause the valve to fit closely within the pipe. The valve A is then placed in position upon the vertical rod E. The bolts G are tightened, so as to securely seat the valve within the opening B. The collar F is passed over the end of the rod E, and the nut $E^3$ is placed upon the end of the rod and is screwed securely down upon the same, thus forcing the valve A securely into place, and at the same time drawing the rod E upward, which vertical movement of the rod E communicates a lateral movement to the horizontal rod J, through the medium of the curved connecting-lever I², and the valve carried upon the outer end of said rod is drawn inwardly and securely seated within the pipe. After securely plugging all of the outlets or openings that may exist in the connecting-pipes of the system, the filling-pipe is connected with the water-supply, and as the pipes gradually fill with water a careful watch is maintained for leaks. When a leak is found, a signal is given, and the attendant at once shuts off the water-supply and loosens the nut E³, thus loosening the valve-plugs and permitting the water within the pipes to pass into the sewer. When the water has been lowered sufficiently to permit, the leak is repaired, the valves are again tightened, and the water admitted through the filling-pipe. When the entire pipe system has been filled so as to cause the water to overflow at the highest point without further leaks being discovered, the pipe system is found perfect and the valves may be removed.

It is evident that the filling-tube need not extend above the top of the valve, as shown, and that instead of passing it through the valve it may enter the main at any point.

Having thus described our invention, what we claim to be new, and desire to secure by Letters Patent, is—

1. Two compressible valves arranged in different planes, an independent stem for each of said valves, and a connection between said stems, combined with a valve controlled filling-tube passing through one of said valves, a sleeve on the valve-stem above one of the valves, and an adjusting-nut on said stem above and bearing on said sleeve, substantially as described.

2. In a device for the purpose described, the combination, with two independent valve-stems arranged at an angle to each other and pivotally connected together at their adjacent ends, and two independent compressible valves, one on each stem, of a filling-tube in one of said valves, a sleeve on one of said stems bearing on one of said valves, and an adjusting-nut on said stem bearing on the sleeve, substantially as and for the purpose specified.

3. In a device for detecting leaks in mains, two separate compressible valves and a separate stem for each valve, combined with a pivoted connection between said stems, and a sleeve on said stem between the nut and valve, and a compression-nut on one of said stems and resting on said sleeve, as set forth.

4. In a device for detecting leaks in mains, two valve-stems arranged substantially at right angles to each other, a compressible valve carried by each of said stems, and a filling-tube, combined with an adjusting-nut on one of said stems, a projection between the valve and nut, and a pivoted connection between the free ends of said stems, substantially as and for the purpose specified.

5. In a device for detecting leaks in mains, the combination, with two valve-stems arranged at substantially right angles with each other, and two valves, one carried by each of said stems, of a pivotal connection between the adjacent ends of said stems, a sleeve on one of said stems, and an adjusting-nut on said stem above said sleeve, as and for the purpose set forth.

6. In a device for detecting leaks in mains, the combination, with two valve-stems arranged at substantially right angles with each other, and two valves, one carried by each of said stems, of a filling-tube, a pivoted connection between the adjacent ends of each of said stems, a sleeve on one of said stems, and an adjusting-nut on said stem above said sleeve, as and for the purpose set forth.

In testimony whereof we affix our signatures in presence of two witnesses.

DANIEL A. B. BAILEY.
NORMAN McGILLIVARY.

Witnesses:
WILLIAM W. IRISH,
JEROME B. BISHOP.